(12) United States Patent
Tai

(10) Patent No.: US 6,741,771 B2
(45) Date of Patent: May 25, 2004

(54) STRUCTURE FOR ADJUSTING WAVEFORMS OF OPTICAL FILTERS USED IN A DENSE WAVELENGTH DIVISION MULTIPLEXING SYSTEM

(75) Inventor: Sue-Lin Tai, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 68 days.

(21) Appl. No.: 09/981,513

(22) Filed: Oct. 16, 2001

(65) Prior Publication Data

US 2002/0136487 A1 Sep. 26, 2002

(30) Foreign Application Priority Data

Mar. 20, 2001 (TW) ........................ 90106451 A

(51) Int. Cl.[7] .............................. G02B 6/28; G02B 6/26; G02B 6/42; G02B 6/32; G02B 6/34
(52) U.S. Cl. .......................... 385/24; 385/32; 385/34; 385/37
(58) Field of Search .................. 385/24, 32, 34, 385/37

(56) References Cited

U.S. PATENT DOCUMENTS

| | | | |
|---|---|---|---|
| 6,115,401 A | * 9/2000 | Scobey et al. ............ | 372/100 |
| 6,185,347 B1 | * 2/2001 | Zheng ........................ | 385/34 |
| 6,282,339 B1 | * 8/2001 | Zheng ........................ | 385/34 |
| 6,295,308 B1 | * 9/2001 | Zah ............................. | 372/50 |
| 6,347,170 B1 | * 2/2002 | Zheng ........................ | 385/34 |
| 6,421,481 B1 | * 7/2002 | Sappey ....................... | 385/37 |
| 6,454,465 B1 | * 9/2002 | Uschitsky et al. ......... | 385/79 |
| 6,532,325 B2 | * 3/2003 | Liu et al. .................... | 385/34 |
| 6,535,668 B2 | * 3/2003 | Liu et al. .................... | 385/33 |
| 6,542,534 B1 | * 4/2003 | Svilans ...................... | 372/92 |

\* cited by examiner

Primary Examiner—John D. Lee
Assistant Examiner—Tina M Lin
(74) Attorney, Agent, or Firm—Wei Te Chung

(57) ABSTRACT

A structure and method for adjusting waveforms of optical filters used in a DWDM system comprises a filter, a GRIN lens and a biporose pigtail with two holes therein. The holes are parallel to a center-axis of the pigtail but at different distance from the center-axis thereof, an input and return optical fiber are secured within the two holes. The GRIN lens is provided with a first end coupled with the biporose pigtail, thus signals from the input fiber can input the lens and the reflected signals from the lens can enter into the return fiber. The GRIN lens further defines a second end angularly to the axis thereof. The filter transmits determining wavelength and is joined with the second end of the GRIN lens.

22 Claims, 4 Drawing Sheets

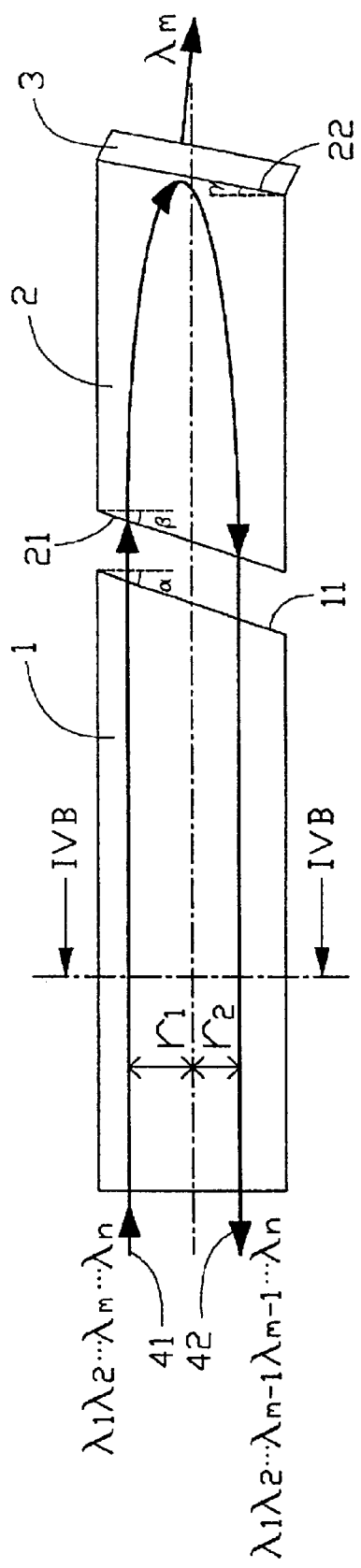
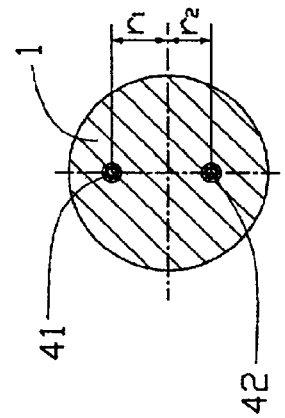
FIG. 4A
FIG. 4B

STRUCTURE FOR ADJUSTING WAVEFORMS OF OPTICAL FILTERS USED IN A DENSE WAVELENGTH DIVISION MULTIPLEXING SYSTEM

BACKGROUND OF THE INVENTION

1. Field of the Invention

The present invention relates to adjusting waveforms of optical filters used in Dense Wavelength Division Multiplexing (DWDM) systems, and more particularly to adjusting wavelengths of optical filters used in DWDM systems to obtain desired transmission and reflection.

2. The Prior Art

Demand for increased transmission capacity in fiber optical communications systems is unrelenting. Conventional transmission technology is increasingly unable to satisfy demands for higher transmission capacity and speed. Dense Wavelength Division Multiplexing (DWDM) technology has helped satisfy demand, and is now in widespread use in optical communications throughout the world. A DWDM system multiplexes a plurality of signals of different wavelengths into single optical fiber at an initial end of the optical fiber. The multiplexed signals are then demultiplexed into a plurality of different optical fibers at a terminal end. Each demultiplexed signal is then output to the end recipient. DWDM systems can increase transmission capacity by ten times or more. The heart of the transmission technology of DWDM systems is multiplexing many signals having different wavelengths into one fiber, and then demultiplexing the multiplexed signals into a plurality of different fibers. The device that achieves this function is a multiplexer/demultiplexer.

Nowadays there is a variety of multiplexer/demultiplexers in use, including multi-dielectric thin film filters, diffraction gratings, fiber bragg gratings (FBGs) and arrayed waveguide gratings (AWGs). Multi-dielectric thin film filters can achieve low insertion loss and high isolation of the multiplexer/demultiplexer. Multi-dielectric thin film filters also enjoy low production costs and established technology, and are therefore in widespread use.

FIGS. 1A, 1B, 2A and 2B show two conventional DWDMs using multi-dielectric thin film filters as the basic wave division device. Referring to FIGS. 1A and 1B, the wave division device comprises a biporose pigtail 51, a gradient index (GRIN) lens 52 and a filter 53 glued on one end of the GRIN lens 52. The biporose pigtail 51 is usually made from a glass rod or other suitable body, and typically has two holes defined therein. Multiplexed signals are transmitted to the GRIN lens 52 through an input fiber 54 inside the biporose pigtail 51. The GRIN lens 52 acts as a convergent lens by converting the multiplexed signals to parallel or near-parallel light, and then transmits the light to the input surface of the filter 53. The filter 53 is pre-formed such that it allows only one specific wavelength $\lambda_m$ to be transmitted therethrough, and reflects all other wavelengths. The reflected signals are then converged by the GRIN lens 52 to enter a return optical fiber 55. The wavelength signal specific to the filter 53 is separated from the multiplexed signals, and transmitted to an output optical fiber (not shown). The input and return optical fibers 54, 55 are symmetrically disposed on opposite sides of a central longitudinal axis of the biporose pigtail 51. Therefore, the reflected signals from the GRIN lens 52 can be completely input into the return optical fiber 55.

Referring to FIGS. 2A and 2B, the wave division device comprises a biporose pigtail 61, a GRIN lens 62 and a filter 63 glued on one end of the GRIN lens 62. Input and return optical fibers 64, 65 are disposed together in a single hole defined in a central longitudinal axis of the biporose pigtail 61

In both these conventional DWDMs, a face of the GRIN lens 52, 62 that is joined to the filter 53, 63 is at a right angle to a central longitudinal axis of the GRIN lens 52, 62. 32-channel conventional DWDM systems are already in commercial use, and the center-wavelength bandwidth is now as small as 0.8 nm or even 0.4 nm. Therefore it is very important to accurately set the center-wavelength of a particular DWDM. Even a minute error in setting of the center-wavelength results in serious consequences such as channel cross talk and failure of transmission to the end recipient. With current technology, precisely setting a particular center-wavelength is very problematic. This is made all the worse because the face of the GRIN lens 52, 62 that is joined to the filter 53, 63 is at a right angle to the central longitudinal axis of the GRIN lens 52, 62; as a result the center-wavelength will be unable to be adjusted, and then the filter will be a no good (NG); unfortunately the case as described above often happens. So it greatly increases the production cost and reduces the efficiency of manufacture.

In addition, manufacturing error such as thickness of layers of the filter may cause the transmitting center wavelength thereof slightly incorrect; however, there is no means for balancing or compensating the incorrect of the transmitting center wavelength of the filter in the prior art.

SUMMARY OF THE INVENTION

To solve the problems of the prior art, the present invention provides a structure for adjusting waveforms of optical filters used in a DWDM system comprising a filter, a GRIN lens and a biporose pigtail with two holes therein. The holes are parallel to a center-axis of the pigtail but at different distances from the center-axis thereof, and an input and return optical fiber are secured within the two holes. The GRIN lens is provided with a first end coupled with the biporose pigtail; thus, signals from the input fiber can input the lens and the reflected signals from the lens can enter into the return fiber. The GRIN lens further defines a second end angularly to the axis thereof. The filter transmits a determined wavelength and is joined with the second end of the GRIN lens.

In addition, the present invention provides a method for adjusting waveforms of optical filters used in a DWDM system, comprising: measuring the actual center-wavelength of the filter; determining a difference between the actual center-wavelength and a desired center-wavelength of the filter; determining an angle γ of the second end of the GRIN lens and distances $r_1$, $r_2$ of the two holes from the center optical axis of the pigtail that will yield the desired center-wavelength; grinding the second end of the GRIN lens to obtain the determined angle γ and forming the pigtail to obtain the determined distances $r_1$, $r_2$; adhering the filter to the second end of the GRIN lens; and integrating the formed pigtail with the combination of the filter and the GRIN lens.

Accordingly, an object of the present invention is to provide a structure and method of adjusting waveforms of optical filters used in a DWDM system which decreases production costs and increases production yields.

Another object of the present invention is to provide a structure and method of adjusting waveforms of optical filters used in a DWDM system which freely balances the uncorrectable transmitting center wavelength of the filter.

Other objects, advantages and novel features of the present invention will be apparent from the following detailed description of preferred embodiments thereof with reference to the attached drawings, in which:

BRIEF DESCRIPTION OF THE DRAWINGS

FIG. 4A is a schematic side view of a multiplexer/demultiplexer having a filter, in accordance with the present invention.

FIG. 4B is a cross-sectional view taken along line IVB—IVB of FIG. 4A;

DETAILED DESCRIPTION OF THE PREFERRED EMBODIMENTS

Figure 1A:
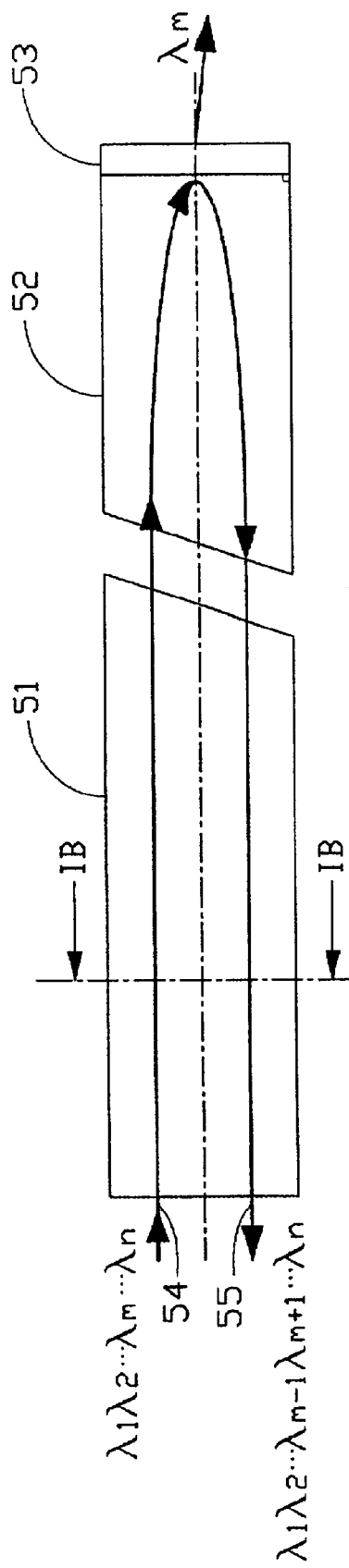
FIG. 1A is a schematic side view of a conventional multiplexer/demultiplexer having a filter.
Figure 1B:
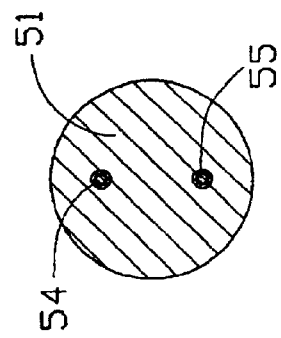
FIG. 1B is a cross-sectional view taken along line IB—IB of FIG. 1A.
Figure 2A:
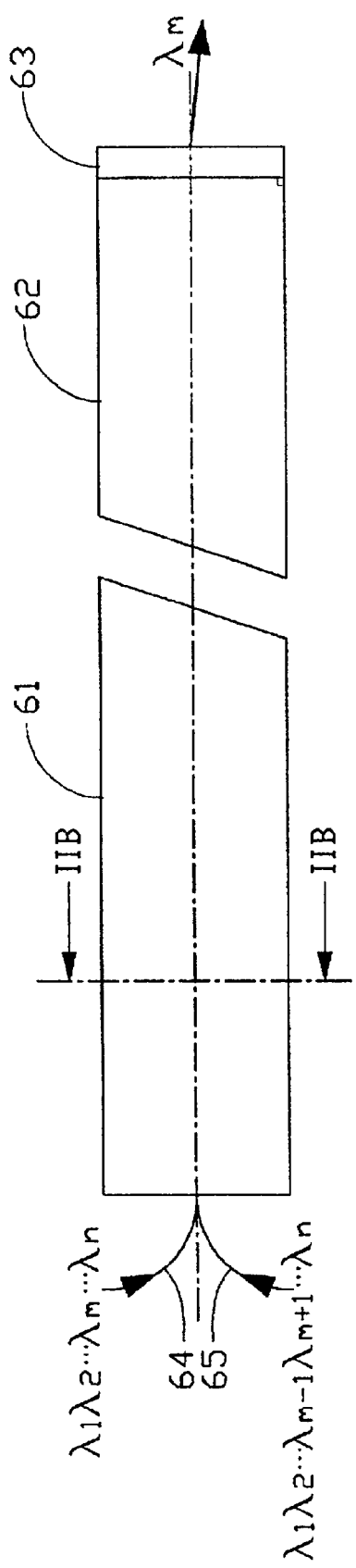
FIG. 2A is another schematic side view of another conventional multiplexer/demultiplexer having a filter.
Figure 2B:
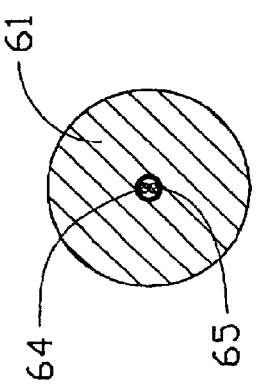
FIG. 2B is a cross-sectional view taken along line IIB—IIB of FIG. 2A.
Figure 3:
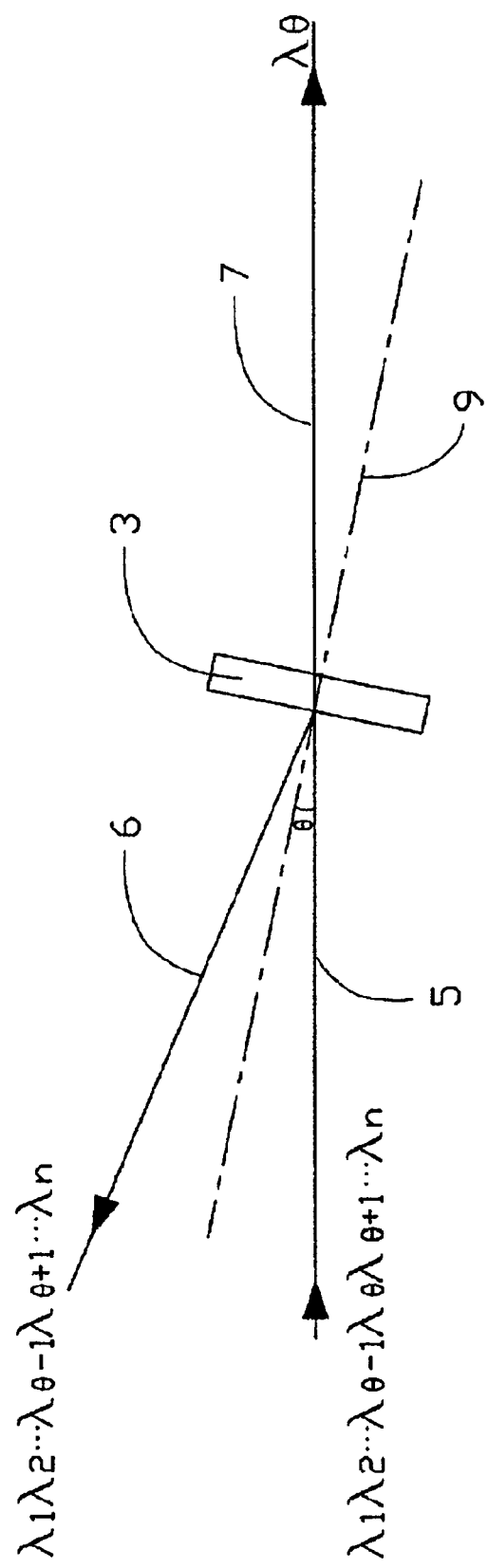
FIG. 3 is a diagram of optical operation of a filter in accordance with the present invention.

FIG. 3 is a working view of a filter 3 in accordance with a preferred embodiment of the present invention. In the preferred embodiment, the filter 3 is a thin film filter and works as follows. When a multiplexed incident optical signal 5 comprising different optical signals $\lambda_1, \lambda_2 \ldots \lambda_{\theta-1}, \lambda_\theta, \lambda_{\theta+1} \ldots \lambda_n$ enters a surface of the filter 3, the optical signal having the wavelength $\lambda_\theta$ is transmitted through and output by the filter 3 as optical signal 7. However, the other optical signals $\lambda_1, \lambda_2 \ldots \lambda_{\theta-1}, \lambda_{\theta+1} \ldots \lambda_n$ are reflected by the filter 3 as optical beam 6. $\lambda_\theta$ is the transmission center-wavelength of the filter 3.

The filter 3 has a normal 9 defined through a center thereof. An angle of incidence θ is defined between the normal 9 and a direction of travel of the optical signal 5. Transmission spectrums of the thin film filter 3 vary according to the angle θ. Assuming that the transmission center-wavelength of the filter 3 is $\lambda_0$ when the angle θ=0, then a relationship of the transmission center-wavelength $\lambda_\theta$ and the angle θ can be described by the followed equation:

$$\lambda_\theta = \lambda_0(1 - a \times \sin 2\theta)$$

wherein 'a' is a constant, a value of which is determined by a refractive index of a dielectric film of the filter 3.

Turning to FIG. 4, a structure of adjusting a waveform of the filter being used in a Dense Wavelength Division Multiplexing (DWDM) system of the present invention comprises four parts: a pigtail 1, a graded index (GRIN) lens 2, a filter 3, and input and return optical fibers 41, 42. Two holes are defined in the pigtail 1, for accommodating the input and return optical fibers 41, 42 therein. The holes are parallel to and at respective opposite sides of a center longitudinal axis of the pigtail 1. One hole is spaced a distance $r_1$ from the center axis of the pigtail 1, and the other hole is spaced a distance $r_2$ from the center axis of the pigtail 1. $r_1$ and $r_2$ are not the same, therefore the holes are asymmetrically spaced from the center axis of the pigtail 1. The input and return optical fibers 41, 42 are secured in the pigtail 1 by means such as gluing. A first end 11 of the pigtail 1 is contiguous with and coupled to a first end 21 of the GRIN Lens 2. An angle α is defined between the first end 11 and a line perpendicular to the center axis of the pigtail 1. An angle β is defined between the first end 21 and a line perpendicular to the center axis of the pigtail 1. In the preferred embodiment, each angle α, β is between approximately 6 and 8 degrees for increasing the return loss. The GRIN Lens 2 has a second end 22 opposite to the first end 21. An angle γ is defined between the second end 22 and a line perpendicular to the center axis of the pigtail 1. The filter 3 is joined with the second end 22 of the GRIN lens 2 by means such as gluing.

After the multiplexed optical signal comprising different wavelengths $\lambda_1 \ldots \lambda_m \ldots \lambda_n$ has entered the input optical fiber 41 and been transmitted to the GRIN lens 2, the multiplexed signal is converged by the GRIN lens 2 to reach the surface of the filter 3 at an angle θ (not shown in FIG. 4A). A value of the angle θ is predetermined by the difference between the actual center-wavelength and a desired center-wavelength of the filter 3. The wavelength $\lambda_m$ corresponding to the equation $\lambda_m = \lambda_0(1 - a \times \sin 2\theta)$ is transmitted through the filter 3. The other wavelengths $\lambda_1 \ldots \lambda_{m-1} \lambda_{m+1} \ldots \lambda_n$ are reflected by the filter 3. This reflected optical signal enters the GRIN lens 2, and is converged by the GRIN lens 2 into the return optical fiber 42.

In a particular application, a filter 3 is required to transmit a center-wavelength having a particular value. One method for attaining such filter 3 is grinding the second end 22 of the GRIN lens 2 such that angle γ has a particular value that yields a center-wavelength having the desired value. Another method for attaining such filter 3 is by forming the pigtail 1 such that the distances $r_1$, $r_2$ yield a center-wavelength having the desired value. The above two methods can also be used in combination. Similarly, when the center-wavelength of the filter 3 shifts from its normal center-wavelength, we can according to the offset, adjust the angle γ formed at the joint of the GRIN lens 1 and the filter 3 or at the same time adjust the distances $r_1$, $r_2$ respectively from the input and return optical fibers 41, 42 to the center-axis of the pigtail 1 which is also the center-axis of the lens 2 in this embodiment; hence, we can gain the accurate center-wavelength of the multiplexer/demultiplexer in practical application.

The above method simplifies manufacturing techniques, increases production yield, and decreases costs.

Thus in another aspect of the present invention, a method of adjusting the waveforms of a filter is provided. Referring to FIG. 4, the method comprises the steps of: measuring the actual center-wavelength of the filter 3; determining a difference between the actual center-wavelength and a desired center-wavelength of the filter 3; determining an angle γ and distances $r_1$, $r_2$ that will yield the desired center-wavelength; grinding the second end 22 of the GRIN lens 2 to obtain the determined angle γ and forming the pigtail 1 to obtain the determined distances $r_1$, $r_2$; adhering the filter 3 to the ground GRIN lens 2; and integrating the formed pigtail 1 with the combination of the filter 3 and the GRIN lens 2.

It is to be understood, however, that even though numerous characteristics and advantages of the present invention have been set forth in the foregoing description, together with details of the structure, function and method of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A structure for adjusting waveforms of optical filters used in a Dense Wavelength Division Multiplexing system, said structure comprising:

an input optical fiber and a return optical fiber;

a biporose pigtail with two holes defined therein, the input and return optical fibers being secured in the holes;

a graded index lens coupled with the pigtail at a first end of the graded index lens, whereby signals transmitted from the input fiber can enter the graded index lens; and a filter being parallel to and joined with a second end of the graded index lens, wherein the second end is opposite to the first end of the graded index lens, and the second end of the graded index lens is oriented at a first acute angle relative to a line that is perpendicular to an optical axis thereof, whereby the reflected signal from the filter can be transmitted through the graded index lens to the return fiber.

2. The structure as described in claim 1, wherein the holes of the pigtail are parallel to a center axis of the pigtail.

3. The structure as described in claim 2, wherein the holes are disposed at opposite sides of the center axis of the pigtail, but at different distances from the center axis.

4. The structure as described in claim 1, wherein an end of the pigtail coupled with the graded index lens is oriented at a second acute angle relative to a line that is perpendicular to a center axis of the pigtail.

5. The structure as described in claim 4, wherein the second acute angle is in the range of approximately 6–8 degrees.

6. The structure as described in claim 1, wherein the first end of the graded index lens is oriented at a third acute angle relative to a line that is perpendicular to a center axis of the pigtail.

7. The structure as described in claim 6, wherein the third acute angle is in the range of approximately 6–8 degrees.

8. The structure as described in claim 1, wherein the filter is a thin film filter.

9. A method of adjusting waveforms of an optical filter used in a Dense Wavelength Division Multiplexing system, the optical filter including a pigtail, an input optical fiber and a return optical fiber to be received in the pigtail, a graded index lens coupled with the pigtail at the first end of the graded index lens, a filter joined with the graded index lens at a second end of the graded index lens, wherein the second end is opposite to the first end, the method comprising the steps of:

measuring an actual center-wavelength of the filter;

determining a difference between the actual center-wavelength and a desired center-wavelength of the filter;

determining an angle of the second end of the graded index lens relative to an optical axis of the graded index lens that will yield the desired center-wavelength, further determining distances of two holes from a center axis of the pigtail that will yield the desired center-wavelength, said two holes to be formed in the pigtail to receive the input and return optical fibers;

grinding the second end to obtain the determined angle, further forming the two holes in the pigtail to obtain the determined distances;

adhering the filter to the second end of the graded index lens;

integrating the pigtail with the combination of the filter and the graded index lens; and securing the input and return optical fibers within the two holes inside the biporose pigtail.

10. The method as described in claim 9, wherein the filter is a thin film filter.

11. The method as described in claim 9, wherein an end of the pigtail contiguous with the graded index lens is oriented at an acute angle relative to a line that is perpendicular to the optical axis of the pigtail.

12. The method as described in claim 11, wherein the acute angle is in the range of approximately 6–8 degrees.

13. The method as described in claim 9, wherein an end of the graded index lens contiguous with the pigtail is oriented at an acute angle relative to a line that is perpendicular to the optical axis of the graded index lens.

14. The method as described in claim 13, wherein the acute angle is in the range of approximately 6–8 degrees.

15. The method as described in claim 9, wherein the holes are parallel to the center axis of the pigtail.

16. The method as described in claim 9, wherein the holes are disposed at opposite sides of the center axis of the pigtail, but at different distances from the center axis.

17. A structure for adjusting waveforms of optical filters used in a Dense Wavelength Division Multiplexing system, comprising:

an input optical fiber and a return optical fiber;

a biporose pigtail with two holes defined therein, said two holes being at predetermined different distances from and parallel to a center axis of the pigtail, the input and return optical fibers being secured in the holes;

a graded index lens coupled with the pigtail at a first end of the graded index lens, whereby signals transmitted from the input fiber can enter the graded index lens; and a filter adhering to a second end of the graded index lens, said second end being opposite to the first end of the graded index lens.

18. The structure as described in claim 17, wherein an end of the pigtail coupled with the graded index lens is oriented at a first angle relative to the center axis of the pigtail.

19. The structure as described in claim 18, wherein the first end of the graded index lens is oriented at a second angle relative to a center axis of the graded index lens.

20. The structure as described in claim 19, wherein the second end of the graded index lens is oriented at a third angle relative to the center axis of the graded index lens.

21. The structure as described in claim 17, wherein a face defined by the second end of the lens is roughly parallel to the filter.

22. The structure as described in claim 17, wherein the two holes commonly define roughly an imaginary plane, said filter is tilted with an angle about an axis which is perpendicular to said imaginary plane.

* * * * *